United States Patent
Handley et al.

(10) Patent No.: US 11,157,026 B1
(45) Date of Patent: Oct. 26, 2021

(54) APPARATUS, SYSTEMS AND METHODS FOR MANAGING FLUIDS COMPRISING A TWO-STAGE POPPET VALVE

(71) Applicant: 3A Holdings, LLC, Houston, TX (US)

(72) Inventors: Daniel Handley, Spring, TX (US); Michael Morris, Attica, MI (US)

(73) Assignee: 3A Holdings, LLC, Houston, TX (US)

( * ) Notice: Subject to any disclaimer, the term of this patent is extended or adjusted under 35 U.S.C. 154(b) by 21 days.

(21) Appl. No.: 16/588,501

(22) Filed: Sep. 30, 2019

Related U.S. Application Data (60) Provisional application No. 62/796,650, filed on Jan. 25, 2019.

(51) Int. Cl.
*G05D 16/10* (2006.01)
(52) U.S. Cl.
CPC ........ *G05D 16/10* (2013.01); *Y10T 137/7905* (2015.04)
(58) Field of Classification Search
CPC .... G05D 7/0133; G05D 16/10; F16K 15/063; F16K 15/026; Y10T 137/7905; Y10T 137/7922; Y10T 137/7932; Y10T 137/7826
See application file for complete search history.

(56) References Cited

U.S. PATENT DOCUMENTS

| | | | |
|---|---|---|---|
| 1,595,459 A | 8/1926 | Durant | |
| 1,736,797 A | 11/1929 | Mortensen | |
| 1,785,271 A | 12/1930 | Lemex | |
| 1,828,697 A | 10/1931 | Yardley | |
| 2,301,276 A | 11/1942 | Gussick | |
| 2,653,792 A * | 9/1953 | Sacchini | F16K 15/026 137/535 |
| 2,744,727 A * | 5/1956 | Osburn | E21B 21/10 137/454.2 |
| 2,886,058 A * | 5/1959 | Horton | F16K 15/063 137/484.2 |
| 3,099,999 A | 8/1963 | Vismara | |
| 3,428,251 A * | 2/1969 | Cooper | G05D 23/08 236/92 R |
| 3,434,495 A | 3/1969 | Scaramucci | |
| 3,542,063 A * | 11/1970 | Etter | F16K 15/063 137/512.3 |
| 3,756,273 A * | 9/1973 | Hengesbach | F16K 15/026 137/540 |
| 3,794,077 A | 2/1974 | Fanshier | |
| 3,894,562 A | 7/1975 | Moseley, Jr. | |
| 4,185,656 A * | 1/1980 | Braukmann | E03C 1/106 137/512.3 |
| 4,284,097 A | 8/1981 | Becker et al. | |

(Continued)

*Primary Examiner* — Jessica Cahill
(74) *Attorney, Agent, or Firm* — Scherrer Patent & Trademark Law, P.C.; Stephen T. Scherrer; Monique A. Morneault (57) ABSTRACT

Apparatuses manage the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. The apparatus comprises a two-stage poppet valve for regulating the flow of fluids through a pipe.

20 Claims, 3 Drawing Sheets

(56) References Cited

U.S. PATENT DOCUMENTS

| | | | | |
|---|---|---|---|---|
| 4,344,450 | A | * | 8/1982 | Walters ............... E03B 7/12 137/62 |
| 4,522,219 | A | * | 6/1985 | Ohkata ............... E03B 7/12 116/218 |
| 4,523,605 | A | * | 6/1985 | Ohkata ............... E03B 7/12 116/218 |
| 4,747,426 | A | | 5/1988 | Weevers |
| 4,877,052 | A | * | 10/1989 | Toshio ............... F16K 5/06 137/512.3 |
| 4,932,429 | A | * | 6/1990 | Watanabe ............... E03B 7/12 116/218 |
| 4,958,657 | A | | 9/1990 | Hagan et al. |
| 5,036,882 | A | | 8/1991 | Norcross et al. |
| 5,080,122 | A | | 1/1992 | Neuzeret |
| 5,123,452 | A | | 6/1992 | LeBlanc |
| 5,425,397 | A | | 6/1995 | Mackal |
| 5,918,637 | A | | 7/1999 | Fleischman |
| 5,937,906 | A | | 8/1999 | Kozyuk |
| 6,024,129 | A | | 2/2000 | Schima |
| 6,119,454 | A | | 9/2000 | Valisko |
| 6,227,240 | B1 | * | 5/2001 | Wu ............... F04B 53/102 137/543.19 |
| 6,250,336 | B1 | | 6/2001 | Murphey et al. |
| 6,443,183 | B1 | | 9/2002 | Roorda |
| 6,866,062 | B2 | | 3/2005 | Lammers |
| 7,051,765 | B1 | | 5/2006 | Kelley |
| 7,086,417 | B2 | | 8/2006 | De Almeida |
| 8,141,790 | B2 | * | 3/2012 | Sheppard ............... F01P 7/16 236/34.5 |
| 8,230,875 | B2 | | 7/2012 | Norman |
| 8,707,981 | B2 | | 4/2014 | Edgeworth |
| 9,162,230 | B2 | | 10/2015 | Wight |
| 10,125,476 | B1 | * | 11/2018 | Handley ............... F16K 15/063 |
| 10,221,965 | B2 | * | 3/2019 | Wyatt ............... F16K 15/063 |
| 2003/0172972 | A1 | * | 9/2003 | Marvin ............... F16K 15/044 137/512.1 |
| 2004/0069352 | A1 | | 4/2004 | Wieland |
| 2007/0044848 | A1 | | 3/2007 | Norman |
| 2007/0235559 | A1 | * | 10/2007 | Miyake ............... F16K 1/12 239/205 |
| 2009/0289207 | A1 | | 11/2009 | Barreda et al. |
| 2010/0101668 | A1 | * | 4/2010 | Roorda ............... F16K 15/063 137/540 |
| 2010/0257916 | A1 | | 10/2010 | Barreda et al. |
| 2012/0118406 | A1 | | 5/2012 | Edgeworth |
| 2015/0122353 | A1 | | 5/2015 | Chiba |

* cited by examiner

APPARATUS, SYSTEMS AND METHODS FOR MANAGING FLUIDS COMPRISING A TWO-STAGE POPPET VALVE

The present invention claims priority to U.S. Prov. Pat. App. No. 62/796,650, titled "Apparatus, Systems and Methods for Managing Fluids Comprising a Two-Stage Poppet Valve," filed Jan. 25, 2019, which is incorporated by reference herein in its entirety.

TECHNICAL FIELD

The present invention relates to apparatuses for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. The apparatus comprises a two-stage poppet valve for regulating the flow of fluids through a pipe.

BACKGROUND

It is, of course, generally known to utilize pipes for transporting fluids, such as water, from one location to another. In modern times, users generally pay for the amount of water that flows into their homes or other buildings based on the volume of usage over a specific timeframe. Businesses, especially, can be saddled with high costs for water, especially when a large amount of water is necessary for industrial processes. Specifically, the more water a home or other building has flowing thereinto, the higher the cost to the user of the water.

However, water meters that measure the flow of water into a home or other building do so by reading the volume of fluid that passes through the water meter. Typically, water meters have a fan-like turbine apparatus that spins as the fluid flows therethrough. The rotation of the turbine apparatus directly correlates to the measurement of the volume of water through the water meter.

Importantly, since the water meter measures the volume of the fluid flowing therethrough, any additional component or material within the water may be falsely registered as water when, in fact, it is not. For example, entrapped gas bubbles, such as air, may accumulate within water pipes before the water reaches the water meter. The gas bubbles may artificially increase the volume flowing into the water meter, causing a false reading, since a water meter typically cannot distinguish between the volume of water and the volume of air. In other words, gas bubbles, such as air, entrapped within water flowing through pipes, may cause a water meter to register a higher volume of water than in actuality.

A need, therefore, exists, for apparatus, systems and methods for decreasing or removing the effect of entrapped bubbles within fluid, such as water, within a pipe. Further, a need exists for apparatus, systems and methods for providing a volume of fluid through a pipe that is more closely representative of the actual volume of the fluid within the pipe.

Specifically, a need exists for apparatus, systems and methods for removing the effect of entrapped gas bubbles within a fluid as the fluid flows through a meter, so that the meter may provide a more accurate reading of the volume of fluid flowing therethrough. In addition, a need exists for apparatus, systems and methods for effectively reducing the cost of water flowing into a home or other building.

Moreover, it is also generally known that water flowing into a home or other building may have periods of backflow, which may interfere with the quality of water that may flow into the home or other building. Specifically, while water may generally move in one direction during times of normal usage, certain occurrences of backflow may cause fouled water, contaminated water, or other fluids, to backflow, thereby fouling or otherwise contaminating the pipes and/or the source of the water.

Indeed, a flood within a home caused by extreme weather or other reasons may cause fouled water to flow the opposite direction within pipes. Moreover, it is feared that a terrorist may attempt to foul or otherwise contaminate fresh water by injecting or otherwise forcing an amount of a contaminated material, such as pathogenic, nuclear or other contamination, back through pipes from a water distribution node, such as a home or the like, into a water source. Backflow preventers are generally known that utilize a valve, such as a poppet or check valve to close when reverse pressure from backflow of fluids occurs. This may generally protect the pipes and/or the source of water from back flow conditions, caused by natural or unnatural conditions.

For example, U.S. Pat. Nos. 1,828,697 and 1,860,004, both to Yardley, disclose a check valve having a floating guide to allow the passage of fluids therethrough, but to prevent the backflow of fluids due to the valve body sitting on valve seat. However, neither of the Yardley patents recognizes the benefits of compressing gas within water or other fluid to provide a more accurate measurement of the flow of water therein in the manner presented herein, or providing a dual-chamber valve apparatus as disclosed in the present invention for backflow prevention.

In addition, U.S. Pat. App. Pub. No. 2012/0118406 to Edgeworth discloses apparatuses and systems to increase the efficiency of a water meter. However, Edgeworth suffers from lack of connectivity to pipes and other apparatuses, and use of an apparatus as described in Edgeworth will lead to failure of the apparatus as it is being used, as the springs are not guided to maintain their positions within the apparatus. Moreover, there is no recognition in Edgeworth to the benefits of a dual chamber apparatus.

However, although backflow preventers within pipes may be required in certain circumstances, backflow prevention is not a requirement in many homes. Thus, many homes or other buildings do not have this important safety feature.

In addition, typical valves utilized to increase the efficiency of water meters utilize a traditional poppet valve configuration, namely a valve head that sits on a valve head seat having a single shaft and spring combination that opens and closes in an oscillating manner based on the water pressure against the valve head. However, the single shaft and spring combination can pose problems. Specifically, the single spring must typically bear the full force of the water pressure, and may become worn over time due to the stress and strain placed thereon. Moreover, if water pressure hits the valve head off-center, which may occur if there is a large amount of air in the pipe, then the valve head may oscillate unevenly, adding further stress to the spring, and increasing the risk of spring displacement or binding.

Moreover, in many cases, typical single shaft valves require a relatively strong spring to induce the afore-mentioned oscillation in the valve head when the water pressure builds to a sufficient extent. However, it may be useful in low flow conditions to allow a certain amount of water to flow through the valve. Oftentimes, the relatively strong spring prevents the flow of low pressure water therethrough. Moreover, the movement of the valve head repeatedly on and off the valve seat can trigger noise and eventually lead to wear of the valve head and/or valve seat.

A need, therefore, exists for improved apparatuses to increase the efficiency of water meters to read a true measurement of a flow of water therethrough. A need further exists for improved apparatuses that are resilient to failure during periods of long use, and can be relied upon.

In addition, a need exists for apparatus, systems and methods that may be utilized as a backflow prevention device within a pipe, such as within a water pipe utilized to distribute fresh and clean water to a home or other building. Moreover, a need exists for apparatus, systems and methods that encourage homeowners or other building owners to install backflow preventers within their pipes to protect their pipes and sources of water.

A need further exists for apparatus, systems and methods that provide the dual purpose of more accurately measuring the flow of water within pipes as well as providing backflow prevention in the event of backflow.

A need further exists for apparatus, systems and methods that disperse the energy impacting the valve head to increase the life of the valve. Specifically, a need exists for apparatus, systems and methods that more readily withstand off-center impacts of water pressure against the valve head that may otherwise lead to stress and strain and a decrease in the working life of the valve.

In addition, a need exists for apparatus, systems and methods that allow for the flow of low pressure water therethrough. Specifically, a need exists for apparatus, systems and methods utilizing a two-stage valve where the first stage includes a relatively weak spring to allow for low flow conditions. Further, a need exists for apparatus, systems and methods utilizing a two-stage valve, where the stages work in conjunction to reduce noise and wear on the internal parts thereof.

SUMMARY OF THE INVENTION

The present invention relates to apparatuses for managing the flow of fluids, such as, for example, water, through pipes. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. The apparatus comprises a two-stage poppet valve for regulating the flow of fluids through a pipe.

To this end, in an embodiment of the present invention, a poppet valve apparatus is provided. The poppet valve apparatus comprises: a housing comprising a first end and a second end, the first end having a fluid inlet and the second comprising an outlet having a fluid outlet; an annular valve seat proximal to the first end of the housing, the annular valve seat having a valve seat surface and further comprising an aperture configured for the flow of water therethrough; a valve head shaped to mate with and close upon the valve seat surface, the valve head further comprising a valve stem extending through the housing from the valve head toward the second end of the housing; a first base fixed proximal the second end of the housing, the first base having at least one aperture configured for water flow therethrough, and a valve stem aperture configured to receive and allow the valve stem to travel therethrough; a medial seat element having a first side and a second side between the valve head and the first base and having a valve stem aperture therein configured to allow the valve stem to travel therethrough; a first spring positioned between the valve head and the first side of the medial seat element; and a second spring positioned between the second side of the medial seat element and the first base.

In an embodiment, the first spring has a first spring constant and the second spring has a second spring constant, wherein the first spring constant is different than the second spring constant.

In an embodiment, the first spring constant is less than the second spring constant.

In an embodiment, the first spring is a coil spring and the second spring is a wave spring.

In an embodiment, the valve seat aperture comprises an inlet, wherein the inlet has rounded corners.

In an embodiment, the valve head is at least partially spherically-shaped.

In an embodiment, the valve head comprises a spring seat indent configured to hold an end of the first spring therein.

In an embodiment, the first base comprises a spring seat indent configured to hold an end of the second spring therein.

In an embodiment, the medial seat element comprises an indent on a first side thereof configured to hold an end of the first spring therein.

In an embodiment, wherein the medial seat element comprises an indent on a second side thereof configured to hold an end of the second spring therein.

In an embodiment, the poppet valve apparatus further comprises: a first indent on the valve head configured to hold a first end of the first spring therein; a second indent on the first side of the medial seat element configured to hold a second end of the first spring therein; a third indent on the second side of the medial seat element configured to hold a first end of the second spring therein; and a fourth indent on the first base configured to hold a second end of the second spring therein.

In an embodiment, the poppet valve apparatus further comprises: a medial seat element indent within the valve head configured to allow the medial seat element to fit therein.

In an embodiment, the poppet valve further comprises: a spring seat indent within the valve head adjacent the medial seat element indent and configured to hold an end of the first spring therein.

In an embodiment, the poppet valve apparatus further comprises: a second base adjacent the first base, the second base comprising an aperture aligning with the at least one aperture within the first base and a valve stem aperture aligning with the valve stem aperture of the first base.

In an embodiment, the poppet valve apparatus further comprises: a third base adjacent the second base, the third base comprising an aperture aligning with the aperture within the second base and a valve stem aperture aligning with the valve stem aperture of the second base.

In an embodiment, the at least one aperture of the first base comprises a funnel-shaped inlet.

In an embodiment, the housing comprises first threads proximal the first end thereof and further wherein the housing comprises second threads proximal the second end thereof, the first and second threads configured to connect the apparatus in-line with a pipe.

In an embodiment, the first base is held proximal the second end via a retaining ring.

In an alternate embodiment of the present invention, a system for regulating water flow through a pipe is provided. The system comprises: a first pipe segment; a second pipe segment; and a poppet valve apparatus disposed between the first pipe segment and the second pipe segment, the poppet valve apparatus comprising a housing comprising a first end and a second end, the first end having a fluid inlet and the second comprising an outlet having a fluid outlet; an annular valve seat proximal to the first end of the housing, the annular valve seat having a valve seat surface and further comprising an aperture configured for the flow of water therethrough; a valve head shaped to mate with and close upon the valve seat surface, the valve head further comprising a valve stem extending through the housing from the valve head toward the second end of the housing; a first base fixed proximal the second end of the housing, the first base having at least one aperture configured for water flow therethrough, and a valve stem aperture configured to receive and allow the valve stem to travel therethrough; a medial seat element having a first side and a second side between the valve head and the first base and having a valve stem aperture therein configured to allow the valve stem to travel therethrough; a first spring positioned between the valve head and the first side of the medial seat element; and a second spring positioned between the second side of the medial seat element and the first base.

In another alternate embodiment of the present invention, a method for regulating water flow through a pipe is provided. The method comprises the steps of: providing a first pipe segment; providing a second pipe segment; providing a poppet valve apparatus comprising a housing comprising a first end and a second end, the first end having a fluid inlet and the second comprising an outlet having a fluid outlet; an annular valve seat proximal to the first end of the housing, the annular valve seat having a valve seat surface and further comprising an aperture configured for the flow of water therethrough; a valve head shaped to mate with and close upon the valve seat surface, the valve head further comprising a valve stem extending through the housing from the valve head toward the second end of the housing; a first base fixed proximal the second end of the housing, the first base having at least one aperture configured for water flow therethrough, and a valve stem aperture configured to receive and allow the valve stem to travel therethrough; a medial seat element having a first side and a second side between the valve head and the first base and having a valve stem aperture therein configured to allow the valve stem to travel therethrough; a first spring positioned between the valve head and the first side of the medial seat element; and a second spring positioned between the second side of the medial seat element and the first base; connecting the first end of the housing of the poppet valve apparatus to the first pipe segment; and connecting the second end of the housing of the poppet valve apparatus to the second pipe segment.

It is, therefore, an objective and advantage of the present invention to provide improved apparatuses, systems and methods to increase the efficiency of water meters to read a true measurement of a flow of water therethrough.

It is an a further objective and advantage of the present invention to provide improved apparatuses, systems and methods that are resilient to failure during periods of long use, and can be relied upon.

It is also an objective and advantage of the present invention to provide apparatuses, systems and methods for decreasing or removing the effect of entrapped bubbles within fluid, such as water, within a pipe.

Further, it is an objective and advantage of the present invention to provide apparatuses, systems and methods for providing a volume of fluid through a pipe that is more closely representative of the actual volume of the fluid within the pipe.

Specifically, it is an objective and advantage of the present invention to provide apparatuses, systems and methods for removing the effect of entrapped gas bubbles within a fluid as the fluid flows through a meter, so that the meter may provide a more accurate reading of the volume of fluid flowing therethrough.

In addition, it is an advantage and objective of the present invention to provide apparatuses, systems and methods for effectively reducing the cost of water flowing into a home or other building.

Moreover, it is an objective and advantage of the present invention to provide apparatuses, systems and methods that may be utilized as a backflow prevention device within a pipe, such as within a water pipe utilized to distribute fresh and clean water to a home or other building.

Moreover, it is an advantage and objective to provide apparatus, systems and methods that encourage homeowners or other building owners to install backflow preventers within their pipes to protect their pipes and sources of water.

It is a further advantage and objective of the present invention to provide apparatuses, systems and methods that provide the dual purpose of more accurately measuring the flow of water within pipes as well as providing backflow prevention in the event of backflow.

Further, it is an advantage and objective of the present invention to provide apparatus, systems and methods that disperse the energy impacting the valve head to increase the life of the valve.

Specifically, it is an advantage and objective of the present invention to provide apparatus, systems and methods that more readily withstand off-center impacts of water pressure against the valve head that may otherwise lead to stress and strain and a decrease in the working life of the valve.

In addition, it is an advantage and objective of the present invention to provide apparatus, systems and methods that allow for the flow of low pressure water therethrough.

Specifically, it is an advantage and objective of the present invention to provide apparatus, systems and methods utilizing a two-stage valve where the first stage includes a relatively weak spring to allow for low flow conditions.

Further, it is an advantage and objective of the present invention to provide apparatus, systems and methods utilizing a two-stage valve, where the stages work in conjunction to reduce noise and wear on the internal parts thereof.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to apparatuses for managing the flow of fluids, such as, for example, water, through pipes.

Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. The apparatus comprises a two-stage poppet valve for regulating the flow of fluids through a pipe.

Figure 1:
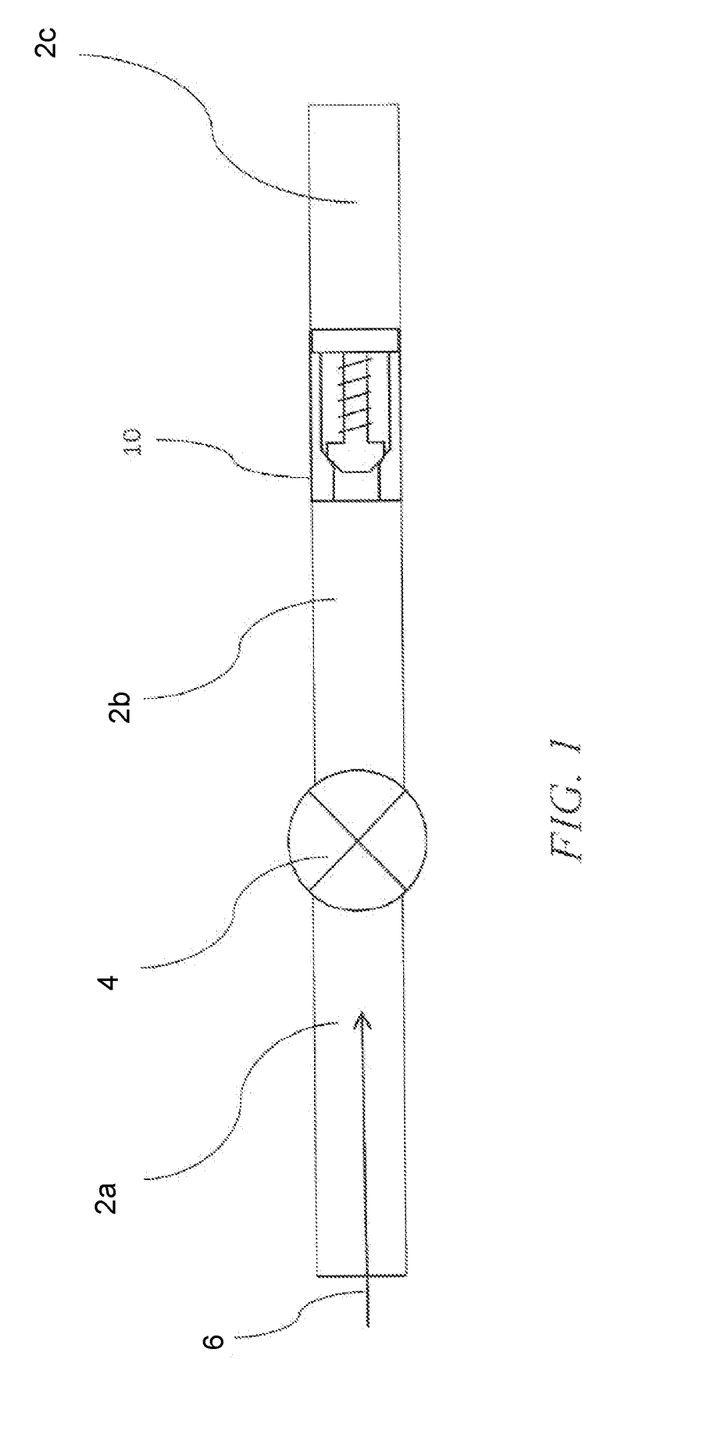
FIG. 1 illustrates a representative of an apparatus of the present invention in-line within a pipe in position to affect the measured volume of water flowing through a water meter in an embodiment of the present invention.

Referring now to the figures, wherein like numerals refer to like parts, FIG. 1 illustrates a representation of an apparatus 10 in an embodiment of the present invention. The apparatus 10 may be disposed in-line with a pipe, represented by pipe sections 2a, 2b, 2c that may provide a flow of a fluid therethrough. The fluid may flow, generally, from left to right in FIG. 1, as represented by the arrow 16. In a preferred embodiment, the fluid may be water, and the pipe sections 2a, 2b, 2c may be parts of a water distribution pipe allowing the flow of fresh and clean water into a home or another building, as apparent to one of ordinary skill in the art. For purposes of the present invention, the fluid will be described as being water. It should be noted, however, that the apparatus 10 of the present invention may be utilized for impacting the flow of other fluids and should not be limited as described herein.

Also in-line with the pipe may be a water meter 4 for measuring the volume of water flowing therethrough. Thus, given a certain period of time, a total volume of water may be determined based on the rate of flow of water volume through the water meter 4. The water meter may be any water meter apparent to one of ordinary skill in the art, and the specific type of water meter is unimportant for purposes of the present invention. It is typical for water flowing within pipes, especially from a source, to contain an amount of air bubbles or other gas entrapped within the water. Gas bubbles within the water flowing through the water meter 4 may cause a falsely higher measurement of water volume flowing therethrough, leading to an inaccurate report. An inaccurate report of the volume of water flowing through the water meter 4 may cause an artificially increased cost of water consumption.

While not being bound by theory, water flowing through the pipe of the present invention may be compressed by having an amount of backward pressure induced on the fluid by the apparatus 10. Specifically, the valve contained within the apparatus 10, as shown in more detail below with respect to FIGS. 2A, 2B and 3, may induce a back pressure on the water upstream from the apparatus 10, thereby compressing the air bubbles in the water upstream from the apparatus 10. The compression of the water compresses the air bubbles within the water to take up a small volume of space in the vicinity immediately upstream from the apparatus 10. Specifically, the compression of the air bubbles may be maintained for approximately five to ten feet upstream from the apparatus 10. Thus, positioning the apparatus downstream but within proximity of the water meter 14 may allow the water meter to measure a truer and more accurate volume of water flowing within the pipe. Thus, it is preferred that the apparatus 10 of the present invention be positioned within three to ten feet downstream of the water meter 14, more preferably four feet to seven feet downstream of the water meter 14, although the present invention should not be limited as described herein.

In operation, a poppet (detailed below) within apparatus 10 oscillates as pressure builds within the pipe 12b, caused by the apparatus 10 pushing back against the flow of water therethrough. The oscillation of the poppet causes the compression of gas within the fluid upstream of the apparatus 10, causing a truer reading of the fluid flow through the water mater 14.

Figure 2A:
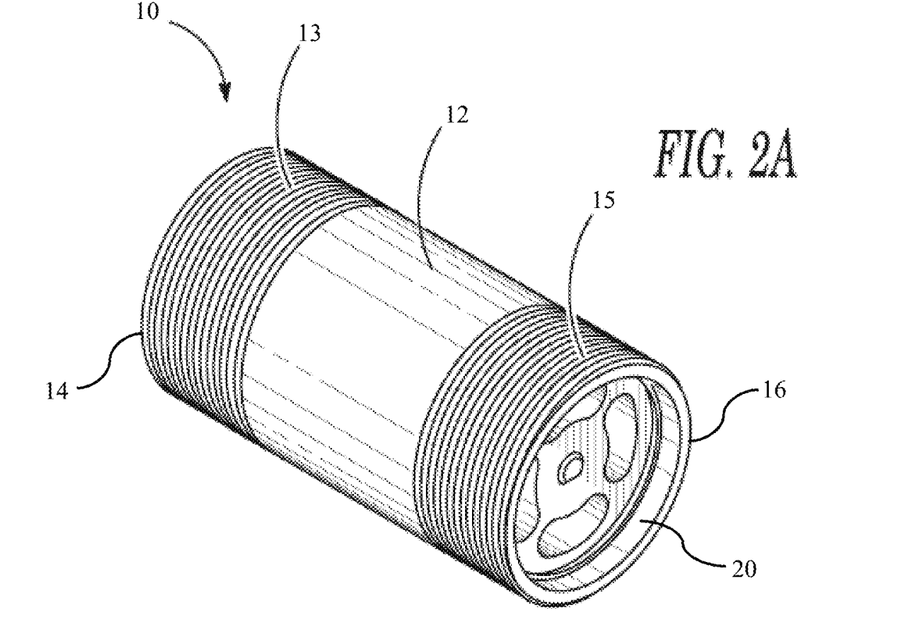
FIGS. 2A and 2B illustrate perspective view of a poppet valve apparatus in an embodiment of the present invention.
Figure 2B:
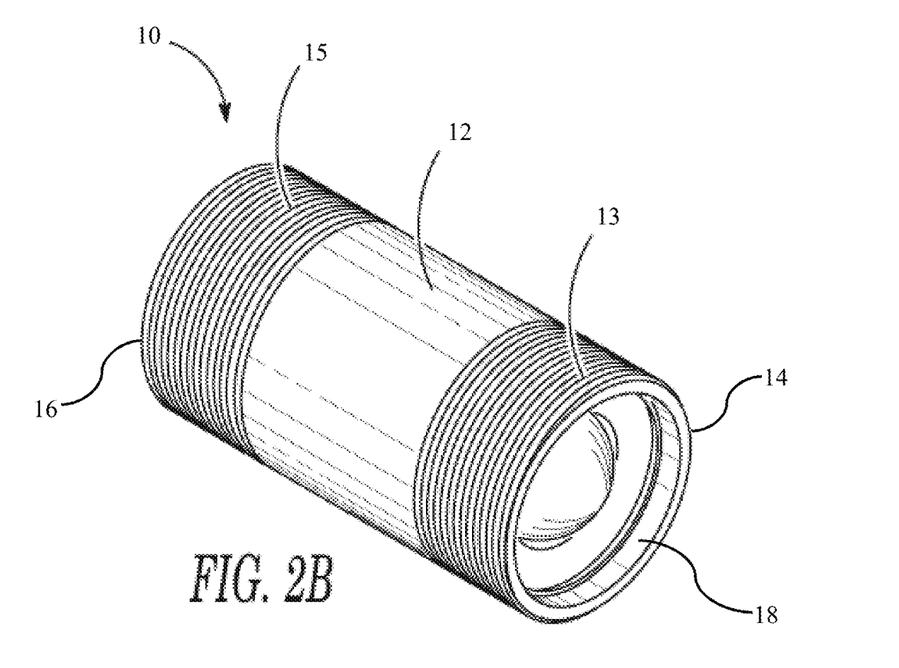

FIGS. 2A and 2B illustrates 10, showing housing 12, which may preferably be cylindrical in shape, a first end 14 having an inlet 18 and a second end 16 thereof having an outlet 20. The first end comprises threads 13 and the second end comprises threads 15, allowing the apparatus 10 to be disposed in-line with a pipe, as described above with respect to FIG. 1, although it should be noted that the apparatus 10 may be connected in-line with a pipe in any manner apparent to one of ordinary skill in the art.

Figure 3:
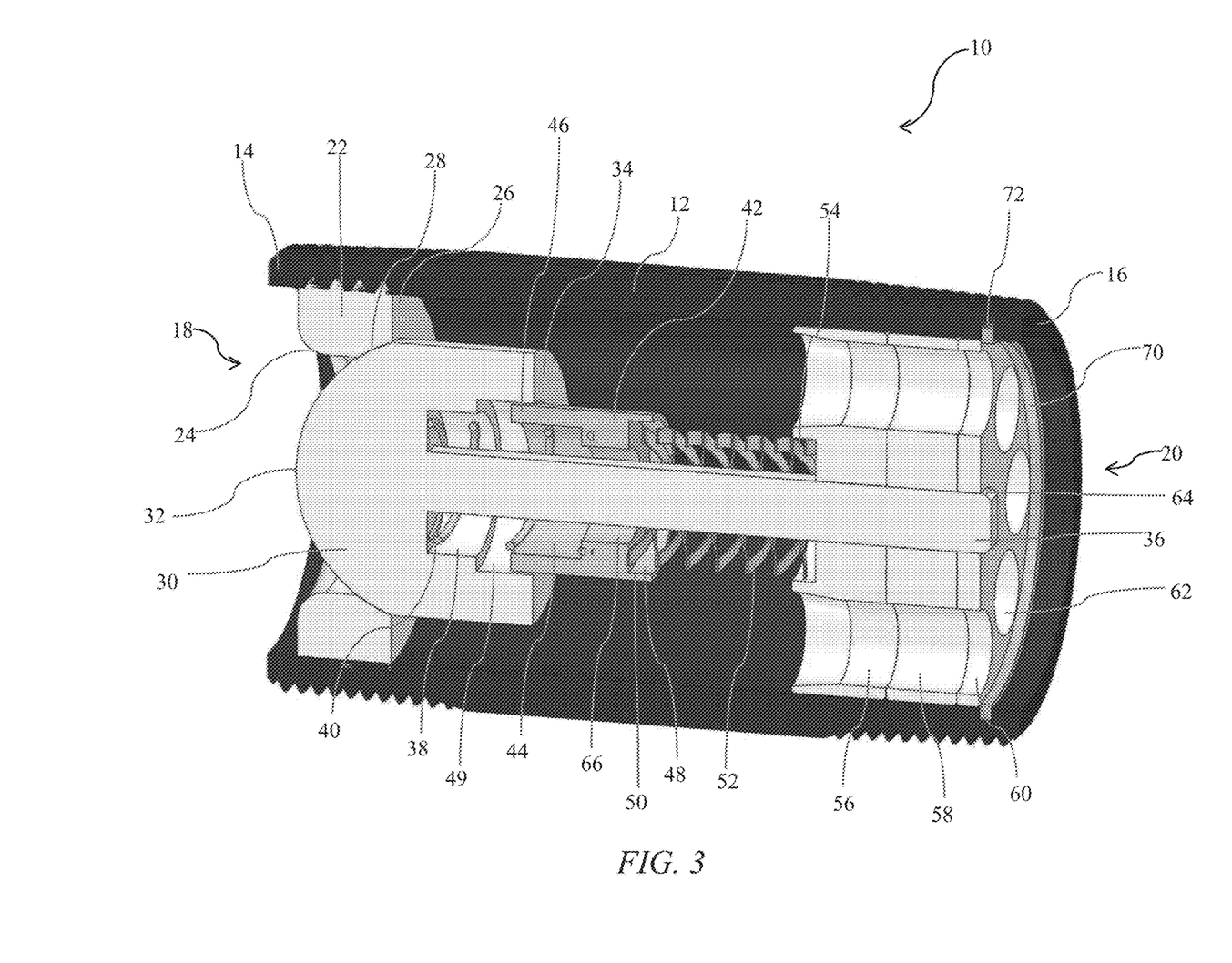
FIG. 3 illustrates a cut-away view of an apparatus for managing fluids in a pipe in an embodiment of the present invention.

FIG. 3 illustrates a cut-away view of apparatus 10 in an embodiment of the present invention. The apparatus 10 comprises housing 12 having the first end 14 and the second end 16, each of which may be connected to extending pipe sections, as detailed in FIG. 1. The first end 14 may comprise the inlet 18 for allowing fluid, such as water, to flow therein, whereas second end 16 may comprise the outlet 20 through which water may flow therefrom.

Water passing through the inlet 18 may pass through an annular valve seat 22 having an inlet side 24 and a seat side 26. The inlet side 24 may be shaped to pass water therethrough minimizing turbulence of the water as it passes, such as rounded and smooth corners. The seat side 26 may have an annular seat surface 28 to receive a valve head 30 that may, at rest, sit upon the seat surface 28 to block the flow of water therethrough until water pressure builds sufficiently to lift the valve head 30 from the valve seat 22.

The valve head 30 may have a front side 32 and a rear side 34, wherein the front side 32 meets water flowing in through the inlet 18, wherein the water flowing therein pushes against the front side 32. Rear side 34 may have a valve stem 36 extending therefrom, and extending through one or more base plates 56, 58, 60, as described in more detail below. Within the rear side 34 of the valve head 30 may be a first spring seat 38 for holding an end of a first spring 40. The first spring 40 may extend from the first spring seat 38 to a medial seat element 42 having a second spring seat 44 on a first side 46 thereof. The medial seat element 42 may have a third spring seat 48 on a second side 50 of the medial element 42 for holding an end of a second spring 52 therein. The second spring 52 may extend between the medial seat element 42 and a first base plate 56 having a fourth spring seat 54 therein. The rear side 34 of the valve head 30 may have a medial seat element seat 49 allowing the medial seat element 42 to fit therein, aiding in aligning the same with the first and second springs 40, 52 around the valve stem 36.

The medial seat element 42 may preferably be a cylinder, as illustrated in FIG. 3, having the second spring seat 44 and the third spring seat 48 therein on first and second sides 46, 50, respectively, although the medial seat element 42 may be any shape. The first spring 40 may preferably be a coil spring and the second spring 52 may preferably be a wave spring, although the invention should not be limited as described herein, as both the first spring 40 and the second spring 52 may be coil springs, or both may be wave springs. The first spring 40 may be relatively weak (having a lower spring constant, for example) compared to the second spring 52, allowing the valve head 30 to move from the valve seat 22 during low water pressure conditions, such as conditions of low water flow. In addition, the relatively weak first spring 40 may allow the valve head 30 to be pushed off the valve seat 22 relatively easily, thereby decreasing noise and wear of the valve head 30 and the valve seat 22 when in operation. As the water pressure increases, the water may compress the second spring 22, thereby moving the valve head further from the valve seat 22 and opening the apparatus 10 for increased water flow. As the water pressure drops, the second spring 52 may close first, followed by the relatively weak spring, thereby decreasing the noise and potential for wear.

The outlet 20 of the apparatus 10 may comprise one or more bases 54, 56, 58, each having apertures 62 to allow water to flow therethrough when the valve head 30 is open. The apertures 62 may be round, oval shape, or any other shape apparent to one of ordinary skill in the art. The one or more bases 56, 58, 60 may restrict the space within the apparatus and provide the fourth spring seat 54 for holding the second spring 52 therein. Any number of bases may be disposed within the apparatus 10, and each base 56, 58, 60 may act as a shim as needed to compress the first and/or second springs 40, 52, depending on the specific water flow needs. Specifically, compressing the first or second springs 40, 52 may increase the spring constants thereof, requiring high water pressure to move the valve head 30 from the valve seat 22. Thus, the apparatus 10 may include only a single base, two bases, three bases, or more bases as necessary to change the compression of the springs 40 and/or 52, thereby making the springs 40 and/or 52 less or more stiff, depending on need.

The bases 56, 58, 60 may be held via a retaining ring 70 that may be disposed within an annular groove 72 within the housing 12. Alternatively, one or more of the bases 56, 58, 60 may have threads therein (not shown) mating with similar threads within the housing 12 (not shown), thereby preventing movement of the same when threaded together.

The bases 56, 58, 60 may further have a valve stem aperture 64 allowing for travel of the valve stem 36 therethrough, such as when the valve head 30 opens due to increased water pressure. Although the valve stem 36 is illustrated as square, it should be noted that the valve stem 36 may be any shape, preferably round in cross-section, as long as the valve stem aperture 64 is similarly shaped to accommodate passage of the valve stem 36 therethrough. The medial seat element 42 may further have a central bore 66 through which the valve stem 36 may pass therethrough. Preferably, the central bore 66 may be relatively larger to allow for water exhaust therethrough, decreasing the possibility that water trapped therein may restrict passage of the valve stem 36 through the central bore 66.

Water, therefore, may flow through inlet 18 and water pressure may push valve head 30 from valve seat 22, wherein the first spring 40 may first compress, followed by second spring 52 if water pressure is sufficient. As water flows through the valve seat 22, the water pressure may drop, thereby allowing the first and/or second springs 40, 52, respectively, to expand and close the valve head 30 on the valve seat 22. This action repeats as water pressure builds on the front side 32 of the valve head 30, creating an oscillating effect as the valve head 30 repeatedly moves from the valve seat 22. The first and second springs 40, 52, respectively, decrease noise and potential for wear of the moving parts therein. Water then moves through apertures 62 within the one or more bases 56, 58, 60 and through outlet 20 at second end 16 of the housing 12.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

We claim:

1. A poppet valve apparatus in-line with a pipe configured for liquid water flow therethrough comprising:
   a housing comprising a first end and a second end, the first end having a fluid inlet and the second end comprising an outlet having a fluid outlet;
   an annular valve seat proximal to the first end of the housing, the annular valve seat having a valve seat surface and further comprising an aperture configured for the flow of water therethrough;
   a valve head shaped to mate with and close upon the valve seat surface, the valve head further comprising a valve stem extending through the housing from the valve head toward the second end of the housing;
   a first base fixed proximal the second end of the housing, the first base having at least one aperture configured for water flow therethrough, and a valve stem aperture configured to receive and allow the valve stem to travel therethrough;
   a medial seat element having a first side and a second side between the valve head and the first base and having a valve stem aperture therein configured to allow the valve stem to travel therethrough;
   a first spring positioned between the valve head and the first side of the medial seat element; and
   a second spring positioned between the second side of the medial seat element and the first base,
   wherein the first spring has a first spring constant configured to cause the valve head to open at the valve seat when acted upon by a water pressure from the liquid water sufficient to allow the water to flow therethrough and to close upon the release of the water pressure, and further wherein the first spring has a spring constant configured to cause the valve head to repeatedly open and close on the valve seat in an oscillating manner when the liquid water flows therethrough.

2. The poppet valve apparatus of claim 1 wherein the second spring has a second spring constant, wherein the first spring constant is different than the second spring constant.

3. The poppet valve apparatus of claim 2 wherein the first spring constant is less than the second spring constant.

4. The poppet valve apparatus of claim 1 wherein the first spring is a coil spring and the second spring is a wave spring.

5. The poppet valve apparatus of claim 1 wherein the valve seat aperture comprises an inlet, wherein the inlet has rounded corners.

6. The poppet valve apparatus of claim 1 wherein the valve head is at least partially spherically-shaped.

7. The poppet valve apparatus of claim 1 wherein the valve head comprises a spring seat indent configured to hold an end of the first spring therein.

8. The poppet valve apparatus of claim 1 wherein the first base comprises a spring seat indent configured to hold an end of the second spring therein.

9. The poppet valve apparatus of claim 1 wherein the medial seat element comprises an indent on a first side thereof configured to hold an end of the first spring therein.

10. The poppet valve apparatus of claim 1 wherein the medial seat element comprises an indent on a second side thereof configured to hold an end of the second spring therein.

11. The poppet valve apparatus of claim 1 further comprising:

a first indent on the valve head configured to hold a first end of the first spring therein;

a second indent on the first side of the medial seat element configured to hold a second end of the first spring therein;

a third indent on the second side of the medial seat element configured to hold a first end of the second spring therein; and a fourth indent on the first base configured to hold a second end of the second spring therein.

12. The poppet valve apparatus of claim 1 further comprising:

a medial seat element indent within the valve head configured to allow the medial seat element to fit therein.

13. The poppet valve apparatus of claim 12 further comprising:

a spring seat indent within the valve head adjacent the medial seat element indent and configured to hold an end of the first spring therein.

14. The poppet valve apparatus of claim 1 further comprising:

a second base adjacent the first base, the second base comprising an aperture aligning with the at least one aperture within the first base and a valve stem aperture aligning with the valve stem aperture of the first base.

15. The poppet valve apparatus of claim 14 further comprising:

a third base adjacent the second base, the third base comprising an aperture aligning with the aperture within the second base and a valve stem aperture aligning with the valve stem aperture of the second base.

16. The poppet valve apparatus of claim 1 wherein the at least one aperture of the first base comprises a funnel-shaped inlet.

17. The poppet valve apparatus of claim 1 wherein the housing comprises first threads proximal the first end thereof and further wherein the housing comprises second threads proximal the second end thereof, the first and second threads configured to connect the apparatus in-line with a pipe.

18. The poppet valve apparatus of claim 1 wherein the first base is held proximal the second end via a retaining ring.

19. A system for regulating liquid water flow through a pipe comprising:

a first pipe segment;

a second pipe segment; and a poppet valve apparatus disposed between the first pipe segment and the second pipe segment, the poppet valve apparatus comprising a housing comprising a first end and a second end, the first end having a fluid inlet and the second end comprising an outlet having a fluid outlet; an annular valve seat proximal to the first end of the housing, the annular valve seat having a valve seat surface and further comprising an aperture configured for the flow of water therethrough; a valve head shaped to mate with and close upon the valve seat surface, the valve head further comprising a valve stem extending through the housing from the valve head toward the second end of the housing; a first base fixed proximal the second end of the housing, the first base having at least one aperture configured for water flow therethrough, and a valve stem aperture configured to receive and allow the valve stem to travel therethrough; a medial seat element having a first side and a second side between the valve head and the first base and having a valve stem aperture therein configured to allow the valve stem to travel therethrough; a first spring positioned between the valve head and the first side of the medial seat element; and a second spring positioned between the second side of the medial seat element and the first base, wherein the first spring has a first spring constant configured to cause the valve head to open at the valve seat when acted upon by a water pressure from the liquid water sufficient to allow the water to flow therethrough and to close upon the release of the water pressure, and further wherein the first spring has a spring constant configured to cause the valve head to repeatedly open and close on the valve seat in an oscillating manner when the liquid water flows therethrough.

20. A method for regulating liquid water flow through a pipe comprising the steps of:

providing a first pipe segment;

providing a second pipe segment;

providing a poppet valve apparatus comprising a housing comprising a first end and a second end, the first end having a fluid inlet and the second end comprising an outlet having a fluid outlet; an annular valve seat proximal to the first end of the housing, the annular valve seat having a valve seat surface and further comprising an aperture configured for the flow of water therethrough; a valve head shaped to mate with and close upon the valve seat surface, the valve head further comprising a valve stem extending through the housing from the valve head toward the second end of the housing; a first base fixed proximal the second end of the housing, the first base having at least one aperture configured for water flow therethrough, and a valve stem aperture configured to receive and allow the valve stem to travel therethrough; a medial seat element having a first side and a second side between the valve head and the first base and having a valve stem aperture therein configured to allow the valve stem to travel therethrough; a first spring positioned between the valve head and the first side of the medial seat element; and a second spring positioned between the second side of the medial seat element and the first base, wherein the first spring has a first spring constant configured to cause the valve head to open at the valve seat when acted upon by a water pressure from the liquid water sufficient to allow the water to flow therethrough and to close upon the release of the water pressure, and further wherein the first spring has a spring constant configured to cause the valve head to repeatedly open and close on the valve seat in an oscillating manner when the liquid water flows therethrough;

connecting the first end of the housing of the poppet valve apparatus to the first pipe segment; and connecting the second end of the housing of the poppet valve apparatus to the second pipe segment.

* * * * *